United States Patent
Liu et al.

(10) Patent No.: US 8,837,861 B2
(45) Date of Patent: Sep. 16, 2014

(54) BAYESIAN APPROACH TO ALIGNMENT-BASED IMAGE HALLUCINATION

(71) Applicant: Microsoft Corporation, Redmond, WA (US)

(72) Inventors: Ce Liu, Arlington, MA (US); Marshall Friend Tappen, Oviedo, FL (US)

(73) Assignee: Microsoft Corporation, Redmond, WA (US)

( * ) Notice: Subject to any disclaimer, the term of this patent is extended or adjusted under 35 U.S.C. 154(b) by 104 days.

(21) Appl. No.: 13/713,003

(22) Filed: Dec. 13, 2012

(65) Prior Publication Data

US 2014/0169700 A1 Jun. 19, 2014

(51) Int. Cl.
*G06K 9/32* (2006.01)
*G06T 7/00* (2006.01)

(52) U.S. Cl.
CPC ............... *G06T 7/0028* (2013.01); *G06K 9/32* (2013.01)
USPC .......................................................... 382/294

(58) Field of Classification Search
USPC .................. 382/118, 225, 254, 260, 294, 305
See application file for complete search history.

(56) References Cited

U.S. PATENT DOCUMENTS

| | | | |
|---|---|---|---|
| 7,379,611 B2 | 5/2008 | Sun et al. | |
| 7,587,099 B2 | 9/2009 | Szeliski et al. | |
| 8,184,926 B2 | 5/2012 | Sun et al. | |
| 8,606,050 B2 * | 12/2013 | Smith et al. | 382/305 |
| 2009/0022414 A1 | 1/2009 | Wei et al. | |
| 2010/0074552 A1 | 3/2010 | Sun et al. | |
| 2010/0085359 A1 | 4/2010 | Wu et al. | |
| 2010/0086227 A1 | 4/2010 | Sun et al. | |
| 2011/0115798 A1 * | 5/2011 | Nayar et al. | 345/473 |
| 2011/0243450 A1 | 10/2011 | Liu | |
| 2011/0299743 A1 | 12/2011 | Ke et al. | |
| 2011/0305404 A1 | 12/2011 | Lin et al. | |
| 2013/0250123 A1 * | 9/2013 | Zhang et al. | 348/164 |

OTHER PUBLICATIONS

Tappen, et al., "A Bayesian Approach to Alignment-based Image Hallucination", Retrieved at <<http://people.csail.mit.edu/celiu/pdfs/ECCV12-ImageHallucination.pdf>>, 12th European Conference on Computer Vision (ECCV), Oct. 7, 2012, pp. 1-14.

Rubinstein, et al., "Annotation Propagation in Large Image Databases via Dense Image Correspondence", Retrieved at <<http://people.csail.mit.edu/celiu/pdfs/ECCV12-annotation.pdf>>, 12th European Conference on Computer Vision (ECCV), Oct. 7, 2012, pp. 1-14.

(Continued)

*Primary Examiner* — Phuoc Tran
(74) *Attorney, Agent, or Firm* — Steve Wight; Judy Yee; Micky Minhas

(57) ABSTRACT

Various technologies described herein pertain to enhancing a quality attribute of an input image. The input image can have a first level of the quality attribute. Dense correspondences between the input image and candidate exemplar images, which are included in an image database, can be computed utilizing a dense image alignment technique. The candidate exemplar images can have a second level of the quality attribute. Further, the candidate exemplar images can be warped to align with the input image based upon the dense correspondences. Moreover, patches from the candidate exemplar images as warped can be integrated with the input image to generate an output image. The output image can have the second level of the quality attribute.

20 Claims, 7 Drawing Sheets

(56) References Cited

OTHER PUBLICATIONS

Liu, et al., "Sift Flow: Dense Correspondence across Different Scenes", Retreived at <<http://www.di.ens.fr/~josef/publications/liu08.pdf>>, 10th European Conference on Computer Vision (ECCV), Sep. 30, 2008, pp. 1-14.

Tanveer, et al., "A Bayesian Approach to Face Hallucination using DLPP and KRR", Retrieved at <<http://ieeexplore.ieee.org/stamp/stamp.jsp?tp=&arnumber=5595953>>, International Conference on Pattern Recognition (ICPR), Aug. 23, 2010, pp. 1-4.

Hsu, et al., "Face Hallucination using Bayesian Global Estimation and Local Basis Selection", Retrieved at <<http://ieeexplore.ieee.org/stamp/stamp.jsp?tp=&arnumber=5662063>>, IEEE International Workshop on Multimedia Signal Processing (MMSP), Oct. 4, 2010, pp. 1-5.

Liu, et al., "Face Hallucination: Theory and Practice", Retrieved at <<http://people.csail.mit.edu/celiu/FaceHallucination/FaceHallucination_IJCV.pdf>>, International Journal of Computer Vision, vol. 75, Issue 1, Oct. 2007, pp. 1-34.

Liu, et al., "Markov Random Fields for Super-Resolution", Retrieved at <<http://people.csail.mit.edu/billf/project%20pages/sresCode/Markov%20Random%20Fields%20for%20Super-Resolution.html>>, Jan. 9, 2011, pp. 1-2.

Freeman, et al., "Learning Low-Level Vision", Retrieved at <<http://www.merl.com/papers/docs/TR2000-05.pdf>>, TR2000-05, Dec. 2000, pp. 1-47.

Sun, et al., "Context-Constrained Hallucination for Image Super-Resolution", Retrieved at <<http://www.cs.ucf.edu/~mtappen/pubs/cvpr10_super_res.pdf>>, in the 2010 IEEE Computer Society Conference on Computer Vision and Pattern Recognition (CVPR 2010), 2010, pp. 231-238.

Barnes, et al., "PatchMatch: A Randomized Correspondence Algorithm for Structural Image Editing", Retrieved at <<http://gfx.cs.princeton.edu/pubs/Barnes_2009_PAR/patchmatch.pdf>>, ACM Trans. Graph, vol. 28, No. 3, 2009, pp. 1-10.

Hacohen, et al., "Non-Rigid Dense Correspondence with Applications for Image Enhancement", Retrieved at <<http://www.cs.huji.ac.il/~yoavhacohen/nrdc/nrdc.pdf>>, ACM Trans. Graph, vol. 30, No. 4, 2011, pp. 1-9.

* cited by examiner

BAYESIAN APPROACH TO ALIGNMENT-BASED IMAGE HALLUCINATION

BACKGROUND

As digital imaging becomes more commonplace, image processing applications that attempt to improve image quality have become more prevalent. According to an example, some image processing applications use information within an input image to enhance image quality of such input image. For instance, various filters can be applied to the input image to enhance image quality. According to another example, some image processing applications use information from one image to enhance image quality of another image. In accordance with an illustration, information from one image can be manually copied and pasted into a different image (e.g., a region of a first image can be manually copied and pasted into a region of a second image).

Still other conventional image processing techniques attempt to create a high-quality image from a low-quality image through inference. For instance, some conventional techniques estimate image information lost in a down-sampling process. These techniques commonly differ in how they model the high-resolution image.

Some conventional approaches model edge statistics, for example. These approaches can produce a higher-resolution image that has sharp edges and is generally smooth in other regions. Given an input image where edges can be identified, these approaches can produce a high-quality result with sharp edges (e.g., a Gaussian profile prior can be used to generate the high-quality result). However, the performance of the conventional approaches that model edge statistics can degrade for low-resolution input images. For instance, given a version of the same input image with reduced quality (e.g., where edges are unable to be identified), the result produced by the Gaussian profile prior can worsen due to lack of edges in the input image.

SUMMARY

Described herein are various technologies that pertain to enhancing a quality attribute of an input image. The input image can have a first level of the quality attribute. Dense correspondences between the input image and candidate exemplar images, which are included in an image database, can be computed utilizing a dense image alignment technique. In accordance with various embodiments, the dense image alignment technique can be scale-invariant feature transform (SIFT) flow; yet, the claimed subject matter is not so limited. The candidate exemplar images can have a second level of the quality attribute. Further, the candidate exemplar images can be warped to align with the input image based upon the dense correspondences. Moreover, patches from the candidate exemplar images as warped can be integrated with the input image to generate an output image. The output image can have the second level of the quality attribute.

According to various embodiments, the image database can be searched to select the candidate exemplar images that match the input image. For instance, the candidate exemplar images selected from the image database may be images that can be down-sampled and warped to match the input image. Thus, a subset of the images in the image database, which match the input image, can be selected as the candidate exemplar images. Moreover, dense correspondences between the input image and the selected subset of the images in the image database (e.g., the candidate exemplar images) can be computed, and the selected subset of the images can be warped. Further, patches from the selected subset of the images as warped can be aggregated with the input image to form the output image.

A Bayesian approach to alignment-based image hallucination is set forth herein. Patches from multiple candidate exemplar images can be aggregated to generate the output image. For example, maximum a posteriori (MAP) estimation can be used to form the output image. In accordance with various examples, the patches can be identified utilizing a soft approximation of a minimum operator; yet, the claimed subject matter is not so limited.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

DETAILED DESCRIPTION

Figure 1:
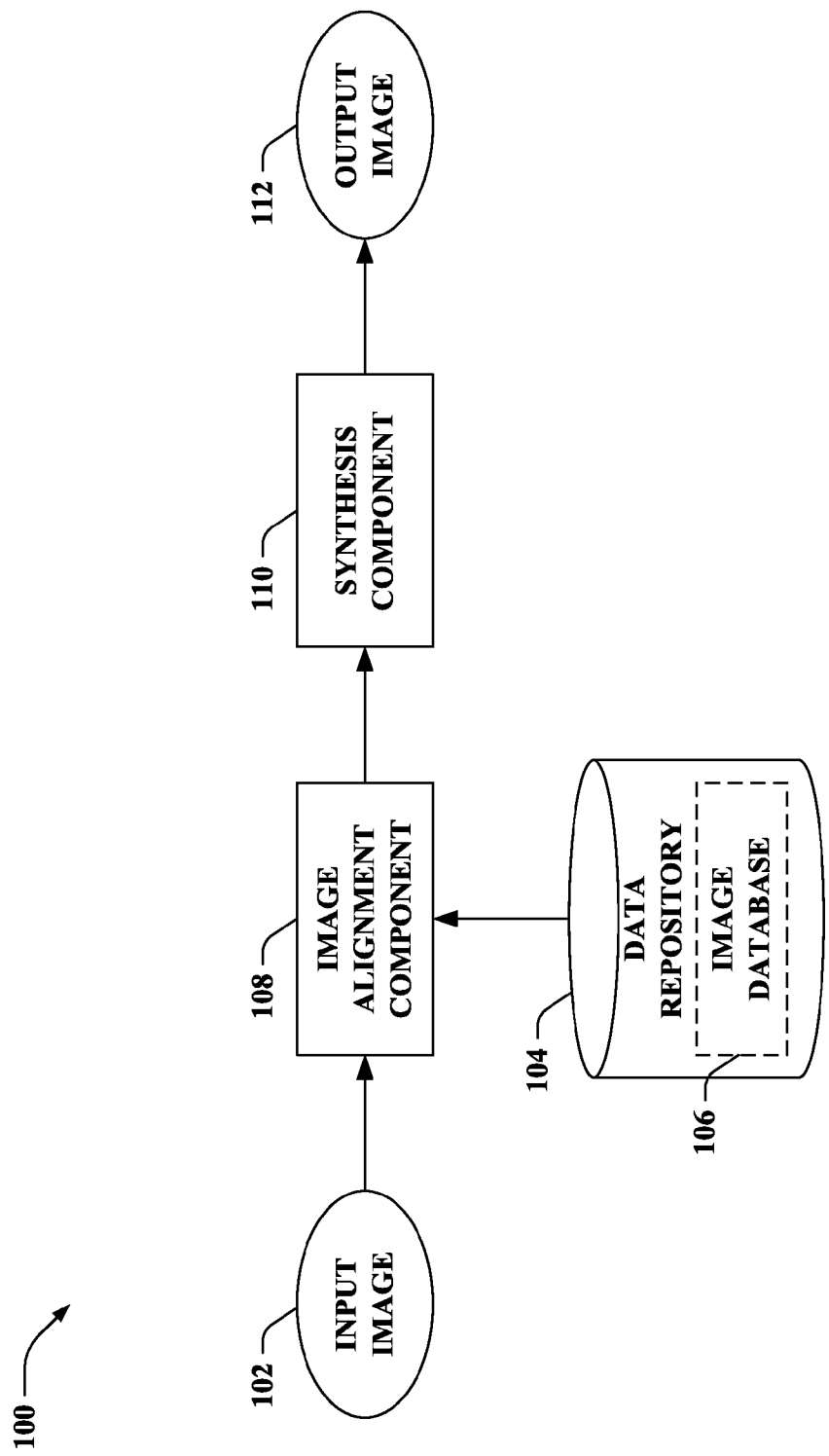
FIG. 1 illustrates a functional block diagram of an exemplary system that enhances a quality attribute of an input image.

Various technologies pertaining to enhancing a quality attribute of an input image utilizing a Bayesian approach to alignment-based image hallucination are now described with reference to the drawings, wherein like reference numerals are used to refer to like elements throughout. In the following description, for the purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Referring now to the drawings, FIG. 1 illustrates a system 100 that enhances a quality attribute of an input image 102. The input image 102 has a first level of the quality attribute. The system 100 employs an alignment-based image hallucination approach to enhance the quality attribute of the input image 102, thereby generating an output image 112 that has a second level of the quality attribute. The system 100 performs image hallucination, where the output image 112 having the second level of the quality attribute is synthesized from the input image 102 having the first level of the quality attribute, using a collection of disparate images that have the second level of the quality attribute.

The system 100 includes a data repository 104, which can further include an image database 106. The image database 106 includes a collection of images that have the second level of the quality attribute. While shown as including one data repository (e.g., the data repository 104) that includes one image database (e.g., the image database 106), it is contemplated that the system 100 can include substantially any number of data repositories and/or substantially any number of image databases.

Examples of the quality attribute include resolution, noise, blurring, scene lighting, exposure time, and the like. According to an example where the quality attribute is resolution, the first level of the resolution can be lower than the second level of the resolution. Following this example, the input image 102 can have a lower resolution than the candidate exemplar images from the image database 106 or the output image 112. According to another example where the quality attribute is noise, the first level of the noise can be higher than the second level of the noise; thus, the input image 102 can be noisier than the candidate exemplar images or the output image 112. By way of yet another example where the quality attribute is blurring, the first level of the blurring can be higher than the second level of the blurring; accordingly, the input image 102 can be blurrier than the candidate exemplar images or the output image 112. It is to be appreciated, however, that the claimed subject matter is not limited to the foregoing examples of the quality attribute, and instead, other quality attributes are intended to fall within the scope of the hereto appended claims.

According to an example, the system 100 can enhance resolution of the input image 102, where the input image 102 has a low resolution such that details are absent in such input image 102. By way of illustration, the input image 102 having a low resolution can be captured using a smartphone camera, web-camera, camera included in or coupled with a computing device, or the like. Moreover, the system 100 can implement an algorithm that utilizes other high-resolution images included in the image database 106 to enhance the resolution of the input image 102. Yet, the claimed subject matter is not limited to the foregoing example.

The system 100 employs a Bayesian approach to alignment-based image hallucination. The system 100 uses dense image alignment algorithms to build dense correspondences between images in the image database 106 and the input image 102. Moreover, the system 100 employs the dense correspondences to transfer high-frequency information (e.g., patches) from the images in the image database 106 to the input image 102 to recover details, which can enhance the quality attribute.

More particularly, the system 100 includes an image alignment component 108 that computes dense correspondences between candidate exemplar images from the image database 106 and the input image 102. The candidate exemplar images can be the images included in the image database 106 or a subset thereof. The image alignment component 108 can compute the dense correspondences between the candidate exemplar images and the input image 102 utilizing a dense image alignment technique. An example of the dense image alignment technique is scale-invariant feature transform (SIFT) flow. Yet, it is contemplated that other dense image alignment techniques are intended to fall within the scope of the hereto appended claims.

Further, the image alignment component 108 can warp the candidate exemplar images to align with the input image 102 based upon the dense correspondences. Thus, the image alignment component 108 can find dense correspondences between the input image 102 and the candidate exemplar images to allow for aligning such images. For example, the input image 102 and the candidate exemplar images can be face images. The dense correspondences are oftentimes semantically meaningful such that eyes correspond to eyes, nose corresponds to nose, contour of the face corresponds to contour of the face, and the like. Following this example, eyes from the candidate exemplar images and eyes from the input image 102 can be identified, and the candidate exemplar images can be warped to align the eyes from the candidate exemplar images with the eyes from the input image 102. Other features from the candidate exemplar images and the input image 102 can similarly be identified, and the candidate exemplar images can similarly be warped based upon such other features. After warping, the warped candidate exemplar images can have features and viewpoints that are aligned with the input image 102, while there may be some discontinuities within the warped candidate exemplar images.

The system 100 further includes a synthesis component 110 that can integrate patches from the candidate exemplar images as warped with the input image 102 to generate an output image 112. The output image 112 can have the second level of the quality attribute. The synthesis component 110 can aggregate the patches with the input image 102 while respecting global image structures. Hence, the image alignment component 108 can perform a global alignment utilizing background knowledge of contexts of objects from the input image 102 and the candidate exemplar images, and the synthesis component 110 can combine the patches from multiple image sources (e.g., the candidate exemplar images) with the input image 102 to generate the output image 112.

As noted above, the synthesis component 110 can integrate the patches from the candidate exemplar images as warped with the input image 102 to generate the output image 112. For instance, the synthesis component 110 can compute a maximum a posteriori (MAP) estimate of the output image 112 using a Bayesian framework. The synthesis component 110 can integrate the patches from the candidate exemplar images as warped with the input image 102 to generate the output image 112 by inferring the output image based upon a cost function that models the similarity between the output image 112 and the input image 102. Further, the cost function can respectively model similarities between filtered versions of each of the patches and at least one of the candidate exemplar images. A filtered version of a given patch can be a difference between the patch having the second level of the quality attribute and the given patch having the first level of the quality attribute. Thus, according to an example, the filtered versions of each of the patches can be high-pass filtered versions of each of the patches. For instance, the synthesis component 110 can recover the output image 112 through minimizing the following cost function:

$$I^*_H = \mathrm{argmin} \lambda_r \|MI_H - I_L\|_2^2 + \Sigma_q \min_j \|I_H(q) - I_j(q+w_j(q))\|_2^2 \quad (1)$$

In the above, $I_L$ denotes the input image 102 and $I_H$ denotes an image having the second level of the quality attribute to be inferred. Under the Bayesian MAP inference framework, the synthesis component 110 finds the output image 112 $I^*_H$ that minimizes the foregoing function. Moreover, M represents a product of a sub-sampling matrix and a 2D convolution matrix, $\lambda_r$ is a coefficient that can control how strongly a reconstruction constraint is imposed, q indexes an image lattice, $w_j$ defines a dense correspondence between $I_H$ and $I_j$, and $I_H(q)$ denotes an image patch of $I_H$ centered at q. Further, I refers to an image as a vector; otherwise, the image is referred to as I.

In the foregoing function, $\lambda_r$ times the quadratic form $\|MI_H - I_L\|_2^2$ is a global constraint to the output image 112. Such global constraint constrains the output image 112 to appear similar to the input image 102 after smoothing and blurring (e.g., cause the output image 112 to match the input image 102 having the first level of the quality attribute). Moreover, the second term, $\min_j \|I_H(q) - I_j(q+w_j(q))\|_2^2$, constrains the patches to appear similar to respective candidate exemplar images (e.g., cause high spatial frequencies in each patch to match at least one of the candidate exemplar images). By solving this function, a Bayesian estimate can be generated by the synthesis component 110 (e.g., the output image 112).

Moreover, the synthesis component 110 can use MAP estimation to estimate the output image 112 by searching for closest patches using a soft approximation of the minimum, which can provide a continuous, expectation maximization (EM)-like minimization. Such approximation is set forth as follows:

$$\lim_{\eta \to \infty} -\frac{1}{\eta} \log \sum_{i=1}^{n} e^{-\eta x_i} = \min_i x_i. \quad (2)$$

In the above, $\eta \geq 0$ controls softness and $x_i$ is a collection of variables $x_1, \ldots, x_n$.

According to an example, the input image, the candidate exemplar images retained in the image database 106, and the output image can be face images; yet, the claimed subject matter is not so limited. Moreover, it is contemplated that the system 100 can enhance quality attributes of video. Thus, the input image 102 can be an input video frame of the input video and the output image 112 can be an output video frame of an output video. Moreover, the input video can have the first level of the quality attribute and the output video can have the second level of the quality attribute.

Figure 2:
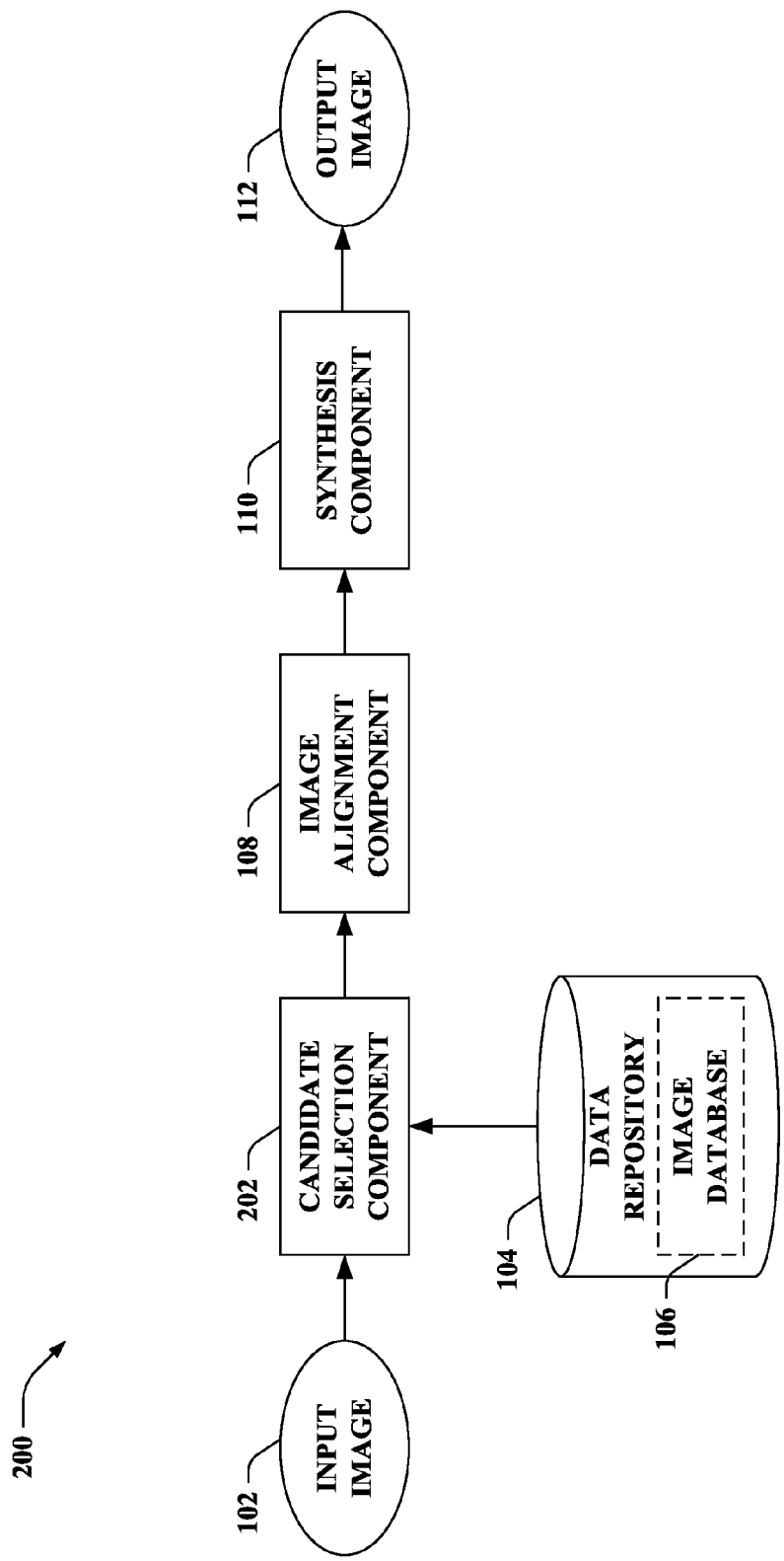
FIG. 2 illustrates a functional block diagram of an exemplary system that selects candidate exemplar images utilized to enhance the quality attribute of the input image by employing alignment-based image hallucination.

Now turning to FIG. 2, illustrated is a system 200 that selects candidate exemplar images utilized to enhance the quality attribute of the input image 102 by employing alignment-based image hallucination. The system 200 includes the data repository 104, the image alignment component 108, and the synthesis component 110. Again, the data repository 104 includes the image database 106. Moreover, the system 200 generates the output image 112, which has the second level of the quality attribute, while the input image 102 has the first level of the quality attribute.

The system 200 further includes a candidate selection component 202 that searches the image database 106 to select the candidate exemplar images that match the input image 102. The candidate exemplar images selected by the candidate selection component 202 can be a subset of the images included in the image database 106. Moreover, the image alignment component 108 can compute the dense correspondences between the candidate exemplar images selected by the candidate selection component 202 and the input image 102 utilizing the dense image alignment technique. Further, the image alignment component 108 can warp the candidate exemplar images to align with the input image 102 based on the dense correspondences. The synthesis component 110 can integrate patches from the candidate exemplar images as warped with the input image 102 to generate the output image 112.

The candidate selection component 202 can search the image database 106 to find images that can be down-sampled and warped to match the input image 102. According to an example, the candidate selection component 202 can select between five and ten candidate exemplar images (e.g., seven candidate exemplar images can be selected by the candidate selection component 202, etc.). However, it is to be appreciated that the claimed subject matter is not limited to the foregoing example, and more than ten or fewer than five candidate exemplar images can be selected by the candidate selection component 202.

The candidate selection component 202 can employ an algorithm that performs a quick alignment between images in the image database 106 and the input image 102 to find the candidate exemplar images that match the input image 102. An example of such an algorithm is Patch Match; yet, it is to be appreciated that other algorithms can be employed by the candidate selection component 202. Given the candidate exemplar images selected by the candidate selection component 202, the image alignment component 108 can use the dense image alignment technique (e.g., SIFT flow) to align versions of each candidate exemplar image (e.g., low-resolution versions) to the input image 102. The dense image alignment technique, such as SIFT flow, can be slower than the algorithm employed by the candidate selection component 202, yet the dense image alignment technique can enforce spatial constraints. Such enforcement of spatial constraints can support enhancing the quality attribute of the input image 102. In accordance with other embodiments, it is contemplated that the algorithm utilized by the candidate selection component 202 can be SIFT flow; however, the claimed subject matter is not so limited.

Various examples set forth below describe enhancing resolution of the input image 102. While many of the examples set forth herein pertain to enhancing resolution of the input image 102, it is to be appreciated that such examples can be extended to other quality attributes other than the resolution. Accordingly, the system 200 can be employed for de-noising or de-blurring the input image 102, for instance. According to another illustration, the system 200 can change a tone of the input image 102 (e.g., to make the input image 102 appear as though taken during the day when in actuality taken at night). Yet, it is to be appreciated that the claimed subject matter is not so limited.

In some conventional image hallucination approaches, a strong assumption is held that images can be aligned to a template on which a prior of high-resolution images is formulated and learned. Realizing a plurality of images of an object such as faces may be unable to be generalized to a single template due to pose and viewpoint variation as well as occlusion, the techniques set forth herein utilize an example-based prior distribution via dense image correspondences. Moreover, a Bayesian formulation based on an image prior that can implement different effective behaviors based on the value of a single parameter can be utilized.

The system 200 can implement an alignment-based approach to hallucinating image detail for single-image super-resolution. In contrast, some conventional techniques attempt to synthesize image content using examples of high-resolution images chosen via approaches such as drawing examples on a patch-by-patch basis, using self-similarity, using user-input, or recognizing textural-properties. The alignment-based approach set forth herein can provide enhanced performance (e.g., for super-resolution) compared to conventional approaches by leveraging regularities in face appearance to hallucinate more detail than could be created from a general image model. Moreover, the alignment-based approach employed by the system 200 can handle pose and viewpoint variations.

The alignment-based image hallucination approach to super-resolution implemented by the system 200 leverages the image database 106 (e.g., which includes a plurality of face images), image matching performed by the candidate selection component 202 and the image alignment component 108, and a MAP estimation framework (e.g., utilized by the synthesis component 110). Accordingly, input face images (e.g., the input image 102) with a wide variety of poses and expressions can be enhanced by the system 200. In contrast to conventional approaches, the image matching performed by the candidate selection component 202 and the image alignment component 108 can be implemented on low-resolution images (e.g., the input image 102 having the first level of the quality attribute). Moreover, the candidate selection component 202 can automatically chose the candidate exemplar images utilized to enhance the input image 102.

As described herein, the input image 102 (e.g., a low-resolution image) can be enhanced to produce the output image 112 (e.g., a high-resolution image). Given the low-resolution input image 102, the image database 106 of candidate exemplar images is searched by the candidate selection component 202 to find images that can be down-sampled and warped to match the input image 102. For example, seven candidate exemplar images can be chosen by the candidate selection component 202; yet, it is contemplated that other numbers of candidate exemplar images can be selected. Moreover, the image alignment component 108 can employ a dense image alignment algorithm, such as SIFT flow, to warp the candidate exemplar images to match the low-resolution input image 102. Further, the synthesis component 110 can compute the MAP estimate of the high-resolution output image 112 using a Bayesian framework, which is further described below.

The Bayesian framework can be used for an example-based super resolution. The super-resolution process can be expressed in a Bayesian MAP inference framework. The variable $I_L$ is used to denote the low-resolution input image 102 and $I_H$ is used to denote the high-resolution image to be inferred. Under the Bayesian MAP inference framework, it can be desired to find an image $I^*_H$ that maximizes the posterior:

$$p(I_H|I_L) \propto p(I_L|I_H)p(I_H). \quad (3)$$

The likelihood function, $p(I_L|I_H)$, expresses the compatibility between the low-resolution input image 102 and some high-resolution image $I_H$. It can be expected that $I_L$ be similar to the result of filtering $I_H$ with an anti-aliasing filter, then down-sampling. This is expressed formally as:

$$p(I_L | I_H) = \frac{1}{Z_r} \exp\{-\lambda_r (MI_H - I_L)^T (MI_H - I_L)\}, \quad (4)$$

In the above, M is the product of a sub-sampling matrix and a 2D convolution matrix and $Z_r$ is a normalization constant. Because this is a conditional Gaussian distribution, the coefficient $\lambda_r$ can be an inverse variance. $\lambda_r$ can also effectively control how strongly this reconstruction constraint is imposed: the larger $\lambda_r$, the stronger the constraint.

Moreover, an effective image prior, $p(I_H)$, can be constructed. A basic prior that focuses on edges, similar to conventional approaches, can be formed by focusing on image gradients:

$$p(I_H) = \frac{1}{Z_g} \exp\left\{-\lambda_g \sum_q |\nabla I_H(q)|\right\} \quad (5)$$

As set forth above, q indexes an image lattice and $$\nabla = \left[\frac{\partial}{\partial x}, \frac{\partial}{\partial y}\right]$$

is a gradient operator. The operator |■| is the L1 norm, $\lambda_g$ scales the regularization, and $Z_g$ is a normalization constant.

Using this prior in an MAP inference formulation leads to the following optimization problem:

$$I^*_H = \mathrm{argmin} \lambda_r (MI_H - I_L)^T (MI_H - I_L) + \lambda_g \Sigma_q |\nabla I_H(q)|, \quad (6)$$

The foregoing can be similar to super-resolution based on a total-variation model.

However, the gradient prior in Equation (5) may be unable to appropriately model the complexity of high-resolution images. Thus, instead of relying on a parametric prior on image gradients, a prior can be formed from a large database of images (e.g., the image database 106), which will be denoted as the set $\{I_i\}_{i=1}^N$. The distribution can be written in a form of Parzen window (or kernel density):

$$p(I_H) = \frac{1}{N} \sum_{i=1}^{N} \frac{1}{Z_i} \exp\{-K(I_H, I_i)\}, \quad (7)$$

In Equation (7), $K(I_H, I_i)$ is a kernel function measuring image similarities, and K(■,■) is introduced below. As $$\int \frac{1}{Z_i} \exp\{-K(I_H, I_i)\} dI_H = 1$$

is enforced, the probability distribution defined in Equation (7) can be seen to be valid.

Further, image similarities can be measured. To measure the similarity between two images, the image alignment component 108 can establish a dense correspondence between the images using the SIFT flow algorithm. If $s_1$ and $s_2$ hold the dense SIFT features for two images, the SIFT flow is obtained by minimizing the following function:

$$E(w) = \Sigma_q \min(\|s_1(q) - s_2(q+w(q))\|_1, t) + \Sigma_q \eta(|u(q)| + |v(q)|) + \Sigma_{(q,p) \in \epsilon} \min(\alpha \|u(p) - u(q)\|, d) + \min(\alpha \|v(p) - v(q)\|, d) \quad (8)$$

In the above, $\epsilon$ are the sets of edges between adjacent pixels and $w_j$ defines a dense correspondence from $I_H$ to $I_j$.

Once the dense correspondence is established, the distance $K(I_H, I_j)$ can be computed (e.g., by the image alignment component 108) by effectively warping one image to match the other, then measuring the difference. Since high frequencies can be transferred to the estimate, as the low frequencies are visible in the observation, the difference is measured on high-pass filtered versions of the image, denoted using $\hat{I}$. This is expressed formally as:

$$K(I_H, I_j) = \sum_q \sum_{p \in N} \left(\hat{I}_H(q+p) - \hat{I}_j(q + w_j(q) + p)\right)^2 \quad (9)$$

$$= \sum_q (I_H(q) - I_j(q + w_j(q)))^T (I_H(q) - I_j(q + w_j(q)))$$

$$= \sum_q \|I_H(q) - I_j(q + w_j(q))\|_2^2,$$

where $N = [-s, \ldots, s] \times [-s, \ldots, s]$ defines a $(2s+1) \times (2s+1)$ patch.

$\hat{I}_H(q)$ denotes the image patch of $\hat{I}_H$ centered at q. This causes the kernel similarity to be based on aggregated patch distances to help avoid matching discontinuities.

As noted above, the candidate selection component 202 can choose a subset of the images included in the image database 106 as the candidate exemplar images. When there are many images in the image database 106, evaluating Equation (7) can be expensive. To mitigate such cost, the candidate selection component 202 can eliminate examples (e.g., images in the image database 106) that are dissimilar to the input image 102 $I_L$ because the likelihood will be low and the contribution of that example will be negligible.

For example, the candidate selection component 202 can use the Patch Match algorithm to quickly eliminate examples that are dissimilar from the input image 102. Before the difference is computed, bilinear image interpolation is used to down-sample and up-sample $I_i$ by the same scale factor that will be used to enlarge the $I_i$. It is contemplated, for example, that images from the image database 106 can be reduced in size to match the size of the input image 102 $I_L$ after it is up-sampled; yet, the claimed subject matter is not so limited.

Using the non-parametric prior, the log posterior can be computed as:

$$= -\log p(I_L \mid I_H) p(I_H) = \quad (10)$$

$$-\log p(I_L \mid I_H) - \log \frac{1}{M} \sum_{I_j \in \Omega I_L} \frac{1}{Z_i} \exp\{-K(I_H, I_j)\}$$

To understand the function of this prior, a soft approximation of the minimum (min) operator based on the log operation can be considered. The min operator over a collection of variables $x_1, \ldots, x_n$ can be approximated as:

$$\min(x_1, \ldots, x_n) \approx -\frac{1}{\eta} \log \sum_{i=1}^{n} e^{-\eta x_i}, \quad (11)$$

where $\eta \geq 0$ controls softness. The approximation gets tighter as $\eta \to \infty$ as set forth above in Equation (2). In the context of this approximation, the prior can be seen as encouraging $I_H$ to resemble one of the candidate exemplar images in the non-parametric prior distribution. This can have the side-effect of effectively choosing one of the candidate exemplar images in the prior, then encouraging every patch in $I_H$ to match the corresponding patch in the chosen candidate exemplar image. This may be problematic when patches in some candidate exemplar images do not match well with the patch in the $I_H$. Thus, it can be desirable to enable different patches in $I_H$ to match different candidate exemplar images, thus, providing the synthesis component 110 flexibility to draw information from a wide variety of the candidate exemplar images.

Again considering the soft approximation of the min operation, finding the MAP estimate of the posterior in Equation (10) can be related to the optimization problem:

$$I^*_H = \operatorname{argmin} \lambda_r \|MI_H - I_L\|_2^2 + \min_j \Sigma_q \|I_H(q) - I_j(q + w_j(q))\|_2^2 \quad (12)$$

To make it possible for patches to be drawn from different images, Equation (12) can be modified to move the min operation inside the summation, resulting in Equation (1) set forth above.

This optimization can be mirrored by modifying the prior to form the posterior:

$$-\log p(I_L \mid I_H) p(I_H) + \ldots - \quad (13)$$

$$\frac{1}{\eta} \sum_q \log \sum_j \frac{1}{M} \exp\{-\eta \|I_H(q) - I_j(q + w_j(q))\|_2^2\},$$

where Z is the normalization constant of the prior and there are M exemplars. Because the patches overlap, this prior is a Markov Random Field with loops in the graph representing this distribution.

This makes the MAP inference procedure become the optimization problem:

$$I^*_H = \operatorname{argmin} \lambda_r \|MI_H - I_L\|_2^2 + \lambda_g \sum_q |\nabla I_H(q)| - \quad (14)$$

$$\frac{1}{\eta} \sum_q \log \sum_j \frac{1}{M} \exp\{-\eta \|I_H(q) - I_j(q + w_j(q))\|_2^2\}.$$

The optimization is implemented by using Jensen's inequality to compute a quadratic upper-bound to the second term in Equation (14). The complete energy-function is optimized by alternating steps of fitting the upper-bound, optimizing the upper-bound, then fitting the bound again.

Moreover, behavior of the system 200 can be controlled through $\eta$. Such formulation can produce a family of systems with different behaviors that are indexed by the parameter $\eta$.

As η approaches 0, the behavior this formulation approaches averaging because:

$$\lim_{\eta \to \infty} -\frac{1}{\eta} \log \frac{1}{n} \sum_{i=1}^{n} e^{-\eta x_i} = \frac{1}{n} \sum_{i=1}^{n} x_i \quad (15)$$

Moreover, as η approaches zero, the negative log posterior in Equation (13) is an upper bound on the negative log posterior in Equation (10). In contrast, as η rises, the min operation is more closely approximated. Increasing η can create sharper images, though the images may include more artifacts. Controlling behavior through η can allow for choosing behavior that is in between pure averaging and a hard min operation. According to an example, $\eta=2^8$ can be utilized; yet, it is to be appreciated that other values are intended to fall within the scope of the hereto appended claims.

The approach implemented by the system 200 optimizes a cost function that is focused on modeling the image formation process. In super-resolution, this makes it possible to incorporate a reconstruction constraint that constrains the estimated image to match the observation (e.g., the input image 102). Moreover, in other applications, an observation can enforce a strong constraint on the final result by employing the system 200.

Figure 3:
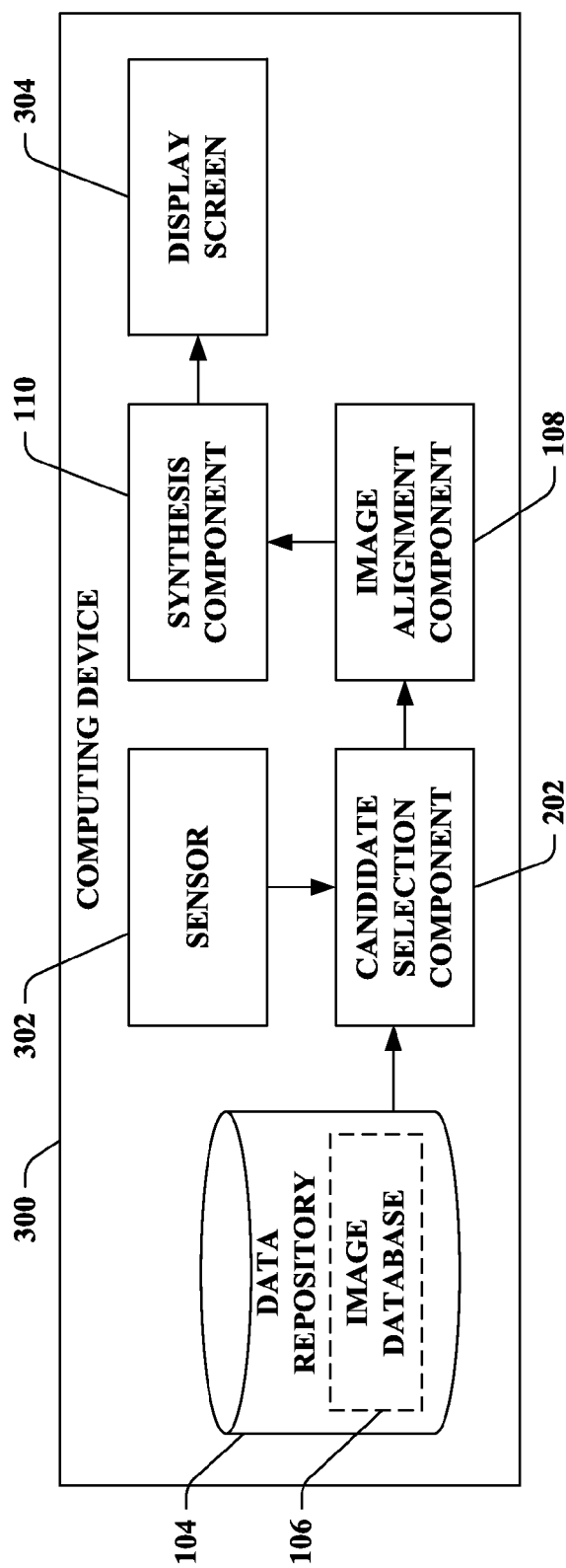
FIG. 3 illustrates a functional block diagram of an exemplary computing device that captures and enhances a quality attribute of an input image.

Now turning to FIG. 3, illustrated is a computing device 300 that captures and enhances a quality attribute of an input image (e.g., the input image 102). The computing device 300 includes the data repository 104, the candidate selection component 202, the image alignment component 108, and the synthesis component 110. Moreover, the computing device 300 includes a sensor 302 that captures the input image. The input image captured by the sensor 302 can be an input face image, for example. Further, the computing device 300 can include a display screen 304 upon which an output image can be displayed.

According to an example, the computing device 300 can be a personal computer, a laptop, a tablet computer, a smartphone, a camera, a gaming device, or the like. Moreover, the sensor 302 can be a camera included in or coupled with the computing device 300. By way of illustration, the sensor 302 can be a web-camera, a camera of a smartphone, or the like; yet, the claimed subject matter is not so limited. For instance, the sensor 302 can capture input images that have a low level of the quality attribute (e.g., low-resolution, blurry, noisy, etc.).

An output image can be generated responsive to capturing the input image with the sensor 302. For instance, responsive to capturing the input image, the candidate selection component 202 can search the image database 106 to select the candidate exemplar images that match the input image. Moreover, the image alignment component 108 can compute dense correspondences between the candidate exemplar images and the input image captured by the sensor 302 utilizing the dense image alignment technique. The image alignment component 108 can further warp the candidate exemplar images to align with the input image based upon the dense correspondences. The synthesis component 110 can integrate patches from the candidate exemplar images as warped with the input image to generate the output image. The output image, for example, can be retained in the data repository 104 (e.g., in the image database 106), displayed on the display screen 304 of the computing device 300, and so forth.

In the example depicted in FIG. 3, the image database 106 is shown as being included in the data repository 104 of the computing device 300. According to such scenario, the image database 106 can include a set of images assembled by a particular user (e.g., the user of the computing device 300). According to other examples, it is contemplated that a remote image database (not shown) can be retained in a data repository of a server (or servers), accessible via a network connection (e.g., retained in data repositories of disparate computing devices), or the like. The remote image database can include the set of images assembled by the particular user (e.g., the user of the computing device 300). By way of another example, it is contemplated that the remote image database can include a set of images assembled by a plurality of users (e.g., other users which may or may not include the particular user, internet collection of images, etc.). Following this example, the set of images included in the remote image database can be indexed by a search engine; thus, the computing device 300 (e.g., the candidate selection component 202) can employ the search engine to find the candidate exemplar images based upon the input image captured by the sensor 302.

By way of illustration, the candidate selection component 202 can initially search the image database 106 retained in the data repository 104 of the computing device 300 for candidate exemplar images. If the candidate selection component 202 is unable to identify the candidate exemplar images that match the input image, then the candidate selection component 202 can search the remotely located image database for the candidate exemplar images. Yet, the claimed subject matter is not limited to the foregoing illustration.

Figure 4:
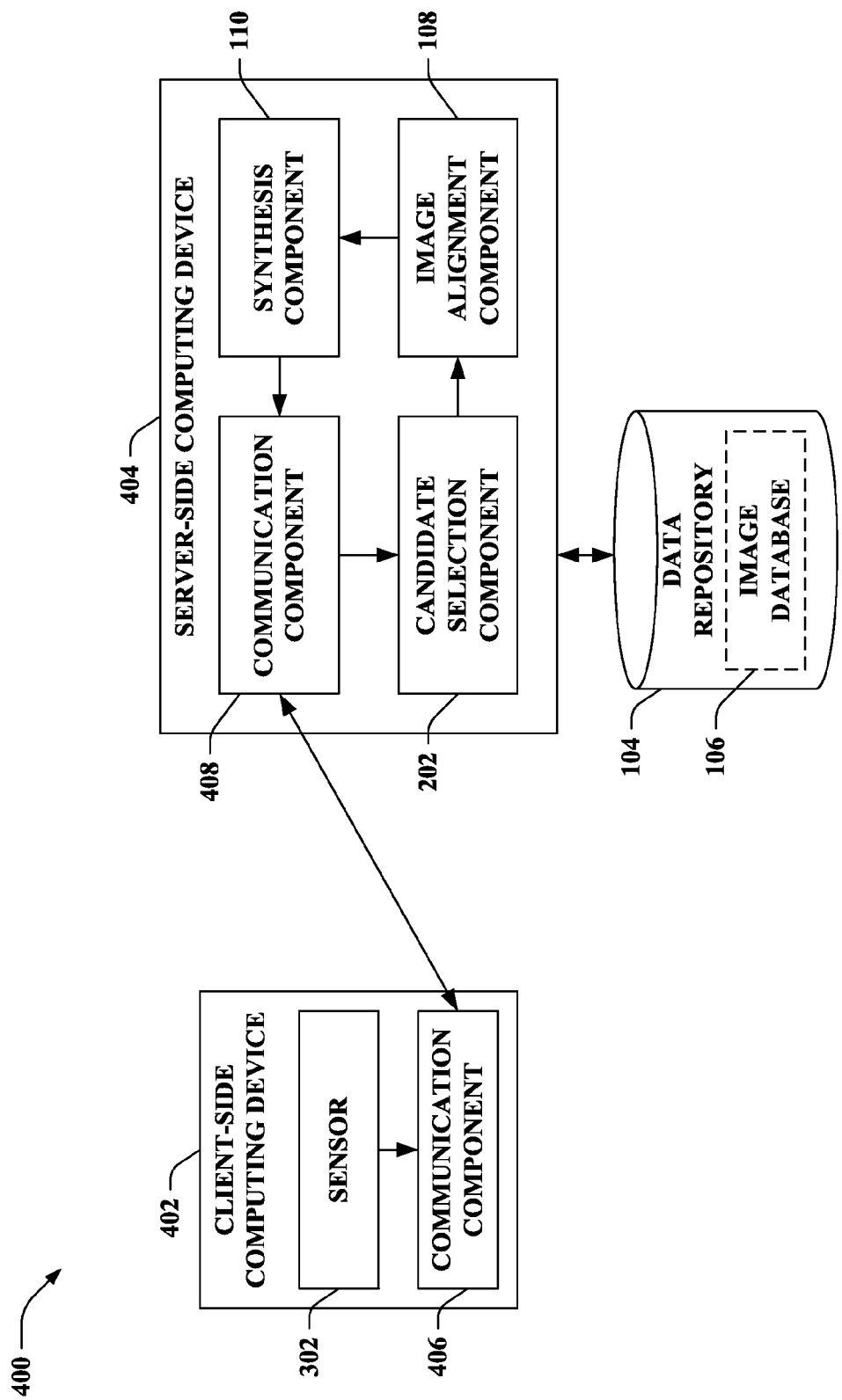
FIG. 4 illustrates a functional block diagram of an exemplary system that improves image quality.

Now referring to FIG. 4, illustrated is another system 400 that improves image quality. The system 400 includes a client-side computing device 402 and a server-side computing device 404. While one client-side computing device (e.g., the client-side computing device 402) and one server-side computing device (e.g., the server-side computing device 404), it is contemplated that the system 400 can include substantially any number of client-side computing devices similar to the client-side computing device 402 and/or substantially any number of server-side computing devices similar to the server-side computing device 404.

The client-side computing device 402 includes the sensor 302, which can capture an input image having a first level of the quality attribute. Moreover, the computing device 402 includes a communication component 406 that can transmit the input image from the client-side computing device 402 to the server-side computing device 404.

The server-side computing device 404 can include a communication component 408 that can receive the input image from the client-side computing device 402. Responsive to receiving the input image from the client-side computing device 402, the server-side computing device 404 can generate an output image having a second level of the quality attribute. The server-side computing device 404 can include the candidate selection component 202, the image alignment component 108, and the synthesis component 110. The candidate selection component 202 can search the image database 106 retained in the data repository 104 to select candidate exemplar images that match the input image. Further, the image alignment component 108 can compute dense correspondences between the candidate exemplar images and the input image utilizing the dense image alignment technique, and can warp the candidate exemplar images to align with the input image based upon the dense correspondences. Moreover, the synthesis component 110 can integrate patches from the candidate exemplar images as warped with the input image to generate an output image.

The communication component 408 can transmit the output image to the client-side computing device 402, for example. According to other examples, it is contemplated that the output image need not be transmitted by the communication component 408 to the client-side computing device 402; rather, the output image can be retained in the data repository 104 (e.g., in the image database 106). According to further examples, it is to be appreciated that the output image can be both transmitted to the computing device 402 and retained in the data repository 104; yet, the claimed subject matter is not so limited.

While FIGS. 3-4 depict exemplary systems that implement the Bayesian approach to alignment-based image hallucination, it is to be appreciated that other systems are intended to fall within the scope of the hereto appended claims.

Figure 5:
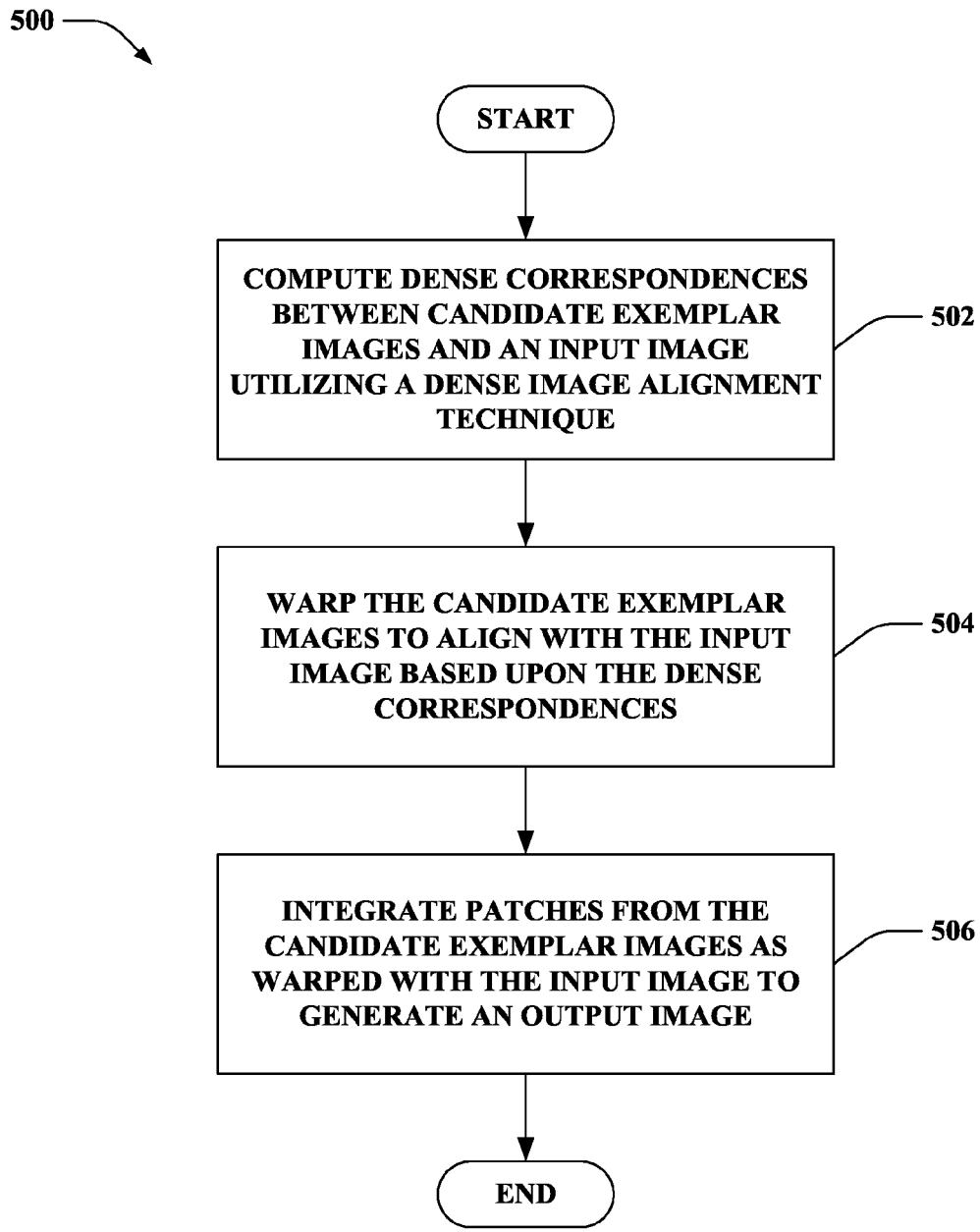
FIG. 5 is a flow diagram that illustrates an exemplary methodology of enhancing a quality attribute of an input image.
Figure 6:
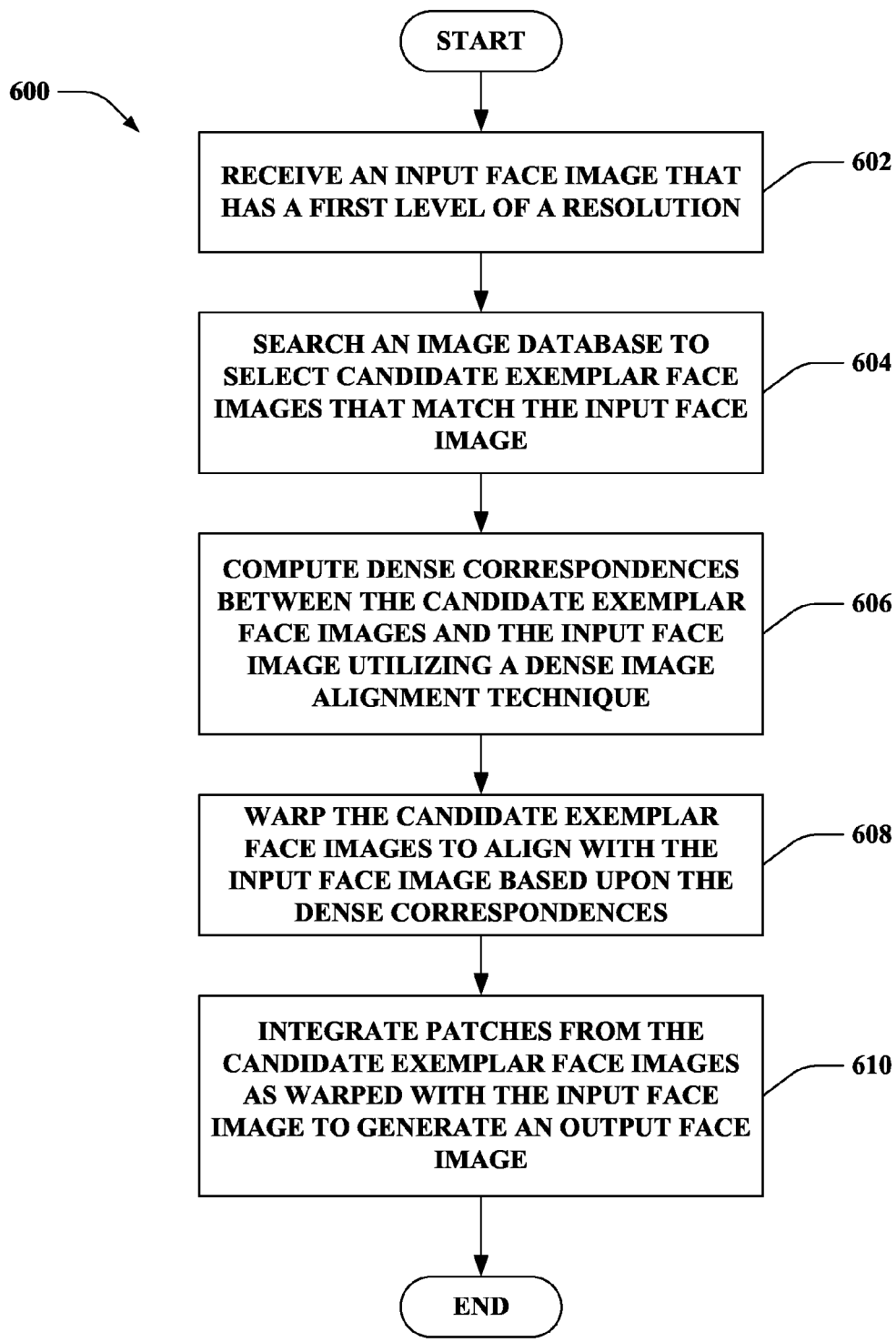
FIG. 6 is a flow diagram that illustrates an exemplary methodology of enhancing image resolution of a low-resolution input face image.

FIGS. 5-6 illustrate exemplary methodologies relating to performing alignment-based image hallucination. While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

FIG. 5 illustrates a methodology 500 of enhancing a quality attribute of an input image. At 502, dense correspondences between candidate exemplar images and the input image can be computed utilizing a dense image alignment technique. For instance, the dense image alignment technique can be SIFT flow; yet, the claimed subject matter is not so limited. The candidate exemplar images can be from an image database. By way of example, the image database can be searched to select the candidate exemplar images that match the input image. Moreover, the input image can have a first level of the quality attribute. Further, the candidate exemplar images can have a second level of the quality attribute.

At 504, the candidate exemplar images can be warped to align with the input image based upon the dense correspondences. At 506, patches from the candidate exemplar images as warped can be integrated with the input image to generate an output image. The output image can have the second level of the quality attribute.

Now turning to FIG. 6, illustrated is a methodology 600 of enhancing image resolution of a low-resolution input face image. At 602, an input face image that has a first level of a resolution (e.g., the low-resolution input face image) can be received. For example, the input face image can be received via a sensor. According to another example, the input face image can be received from a disparate computing device (e.g., from a client-side computing device). At 604, an image database can be searched to select candidate exemplar face images that match the input face image. The candidate exemplar face images can have a second level of the resolution (e.g., high-resolution). At 606, dense correspondences between the candidate exemplar face images and the input face image can be computed utilizing a dense image alignment technique. At 608, the candidate exemplar face images can be warped to align with the input face image based upon the dense correspondences. At 610, patches from the candidate exemplar face images as warped can be integrated with the input face image to generate an output face image. The output face image can have the second level of the resolution.

Figure 7:
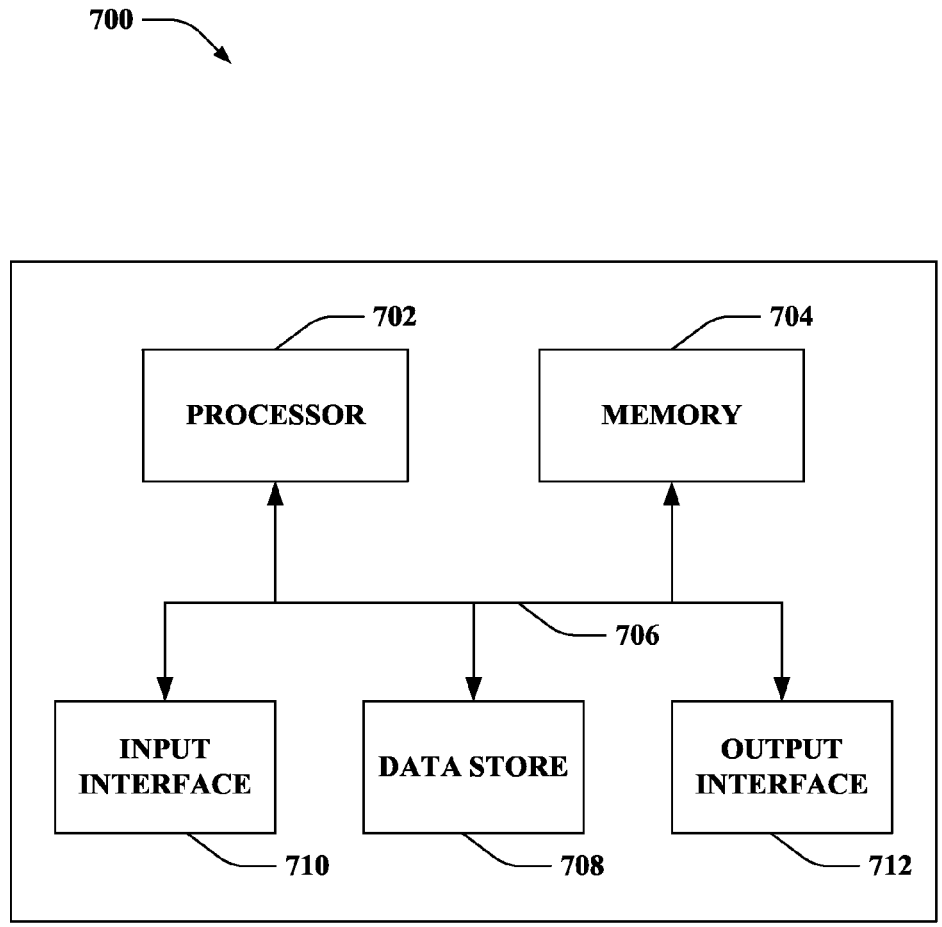
FIG. 7 illustrates an exemplary computing device.

Referring now to FIG. 7, a high-level illustration of an exemplary computing device 700 that can be used in accordance with the systems and methodologies disclosed herein is illustrated. For instance, the computing device 700 may be used in a system that employs an alignment-based technique for image hallucination, where an input image having a first level of a quality attribute can be enhanced to generate an output image having a second level of a quality attribute. The computing device 700 includes at least one processor 702 that executes instructions that are stored in a memory 704. The instructions may be, for instance, instructions for implementing functionality described as being carried out by one or more components discussed above or instructions for implementing one or more of the methods described above. The processor 702 may access the memory 704 by way of a system bus 706. In addition to storing executable instructions, the memory 704 may also store input images, output images, an image database, and so forth.

The computing device 700 additionally includes a data store 708 that is accessible by the processor 702 by way of the system bus 706. The data store 708 may include executable instructions, input images, output images, an image database, etc. The computing device 700 also includes an input interface 710 that allows external devices to communicate with the computing device 700. For instance, the input interface 710 may be used to receive instructions from an external computer device, from a user, etc. The computing device 700 also includes an output interface 712 that interfaces the computing device 700 with one or more external devices. For example, the computing device 700 may display text, images, etc. by way of the output interface 712.

It is contemplated that the external devices that communicate with the computing device 700 via the input interface 710 and the output interface 712 can be included in an environment that provides substantially any type of user interface with which a user can interact. Examples of user interface types include graphical user interfaces, natural user interfaces, and so forth. For instance, a graphical user interface may accept input from a user employing input device(s) such as a keyboard, mouse, remote control, or the like and provide output on an output device such as a display. Further, a natural user interface may enable a user to interact with the computing device 700 in a manner free from constraints imposed by input device such as keyboards, mice, remote controls, and the like. Rather, a natural user interface can rely on speech recognition, touch and stylus recognition, gesture recognition both on screen and adjacent to the screen, air gestures, head and eye tracking, voice and speech, vision, touch, gestures, machine intelligence, and so forth.

Additionally, while illustrated as a single system, it is to be understood that the computing device 700 may be a distributed system. Thus, for instance, several devices may be in communication by way of a network connection and may collectively perform tasks described as being performed by the computing device 700.

As used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices.

Further, as used herein, the term "exemplary" is intended to mean "serving as an illustration or example of something."

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

Alternatively, or in addition, the functionally described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the details description or the claims, such term is intended to be inclusive in a manner similar to the term "comprising" as "comprising" is interpreted when employed as a transitional word in a claim.

What is claimed is:

1. A method of enhancing a quality attribute of an input image, comprising:
   computing dense correspondences between candidate exemplar images and the input image utilizing a dense image alignment technique, wherein the candidate exemplar images are from an image database, wherein the input image has a first level of the quality attribute, and wherein the candidate exemplar images have a second level of the quality attribute;
   warping the candidate exemplar images to align with the input image based upon the dense correspondences; and
   integrating patches from the candidate exemplar images as warped with the input image to generate an output image having the second level of the quality attribute.

2. The method of claim 1, further comprising searching the image database to select the candidate exemplar images that match the input image, wherein the candidate exemplar images are a subset of images included in the image database.

3. The method of claim 1, wherein integrating the patches from the candidate exemplar images as warped with the input image to generate the output image further comprises inferring the output image based upon a cost function that models similarity between the output image and the input image and respectively models similarities between filtered versions of each of the patches and at least one of the candidate exemplar images, wherein a filtered version of a given patch is a difference between the given patch having the second level of the quality attribute and the given patch having the first level of the quality attribute.

4. The method of claim 1, wherein integrating the patches from the candidate exemplar images as warped with the input image to generate the output image further comprises computing a maximum a posteriori (MAP) estimate of the output image using a Bayesian framework.

5. The method of claim 1, wherein the quality attribute is resolution, and wherein the first level of the resolution is lower than the second level of the resolution.

6. The method of claim 1, wherein the quality attribute is noise, and wherein the first level of the noise is higher than the second level of the noise.

7. The method of claim 1, wherein the quality attribute is blurring, and wherein first level of the blurring is higher than the second level of the blurring.

8. The method of claim 1, wherein the dense image alignment technique is scale-invariant feature transform (SIFT) flow.

9. The method of claim 1, wherein the input image is an input video frame of an input video and the output image is an output video frame of an output video, wherein the input video has the first level of the quality attribute, and wherein the output video has the second level of the quality attribute.

10. The method of claim 1, wherein the input image, the candidate exemplar images, and the output image are face images.

11. The method of claim 1, further comprising:
    receiving the input image from a client-side computing device that captured the input image, wherein the output image is generated responsive to receiving the input image; and
    transmitting the output image to the client-side computing device.

12. The method of claim 1, further comprising capturing the input image, wherein the output image is generated responsive to capturing the input image.

13. The method of claim 1, wherein the image database comprises a set of images assembled by a particular user.

14. The method of claim 1, wherein the image database comprises a set of images indexed by a search engine.

15. A system, comprising:
    a processor; and
    a memory that comprises a plurality of components that are executed by the processor, the plurality of components comprising:
       a candidate selection component that searches an image database to select candidate exemplar face images that match an input face image, wherein the input face image has a first level of a quality attribute, and wherein the candidate exemplar face images have a second level of the quality attribute;

an image alignment component that:
    computes dense correspondences between the candidate exemplar face images and the input face image utilizing a dense image alignment technique; and
    warps the candidate exemplar face images to align with the input face image based upon the dense correspondences; and a synthesis component that integrates patches from the candidate exemplar face images as warped with the input face image to generate an output face image having the second level of the quality attribute.

16. The system of claim 15, wherein the quality attribute is at least one of resolution, noise, blurring, exposure time, or lighting.

17. The system of claim 15 comprised by a computing device, wherein the computing device further comprises a sensor that captures the input face image.

18. The system of claim 15, wherein the dense image alignment technique is scale-invariant feature transform (SIFT) flow.

19. The system of claim 15, wherein the synthesis component infers the output image based upon a cost function that models similarity between the output face image and the input face image and respectively models similarities between high-pass filtered versions of each of the patches and at least one of the candidate exemplar face images.

20. A computing device, comprising:
    a sensor that captures an input face image having a first level of a resolution;
    a processor; and
    a memory that comprises a plurality of components that are executed by the processor, the plurality of components comprising:
        a candidate selection component that searches an image database to select candidate exemplar face images that match the input face image, wherein the candidate exemplar face images have a second level of the resolution;
        an image alignment component that:
            computes dense correspondences between the candidate exemplar face images and the input face image utilizing a dense image alignment technique; and
            warps the candidate exemplar face images to align with the input face image based upon the dense correspondences; and
        a synthesis component that integrates patches from the candidate exemplar face images as warped with the input face image to generate an output face image having the second level of the resolution.

* * * * *